United States Patent [19]

Balasubramanian et al.

[11] Patent Number: 5,557,634
[45] Date of Patent: Sep. 17, 1996

[54] MULTIPROTOCOL DIRECTED INFRARED COMMUNICATION CONTROLLER

[75] Inventors: Peruvemba S. Balasubramanian, Chappaqua; Nathan J. Lee, New City; Scott D. Lekuch, New York, all of N.Y.

[73] Assignee: International Business Machines Corporation, Armonk, N.Y.

[21] Appl. No.: 323,282

[22] Filed: Oct. 14, 1994

[51] Int. Cl.⁶ .................................................. H04L 27/02
[52] U.S. Cl. .......................................... 375/222; 379/93
[58] Field of Search ................................ 375/222, 219, 375/220, 257, 377; 379/93; 364/919.1; 370/41, 43, 49

[56] References Cited

U.S. PATENT DOCUMENTS 4,715,044  12/1987  Gartner .................................. 375/222
5,450,530   9/1995  Snyder .................................. 375/222

Primary Examiner—Stephen Chin
Assistant Examiner—Kevin Kim
Attorney, Agent, or Firm—Perman & Green

[57] ABSTRACT

A directed infrared (IR) communication controller which supports interoperability among protocols and which can communicate at baud rates of up to 2.34 Mbps while supporting the IRDA standard as well as Sharp's 500 KHz ASK, NRZI, and Biphase modulated IR systems. A method for automatically determining which type of infrared signal is being received is also described.

30 Claims, 3 Drawing Sheets

OF: Opening Flag, 01111110 binary
ADDR: 8 bit Address Field (Optional)
DATA: Data Field
16b CRC: CCITT 16 bit CRC
CF: Closing Flag, 01111110 binary

5,557,634

MULTIPROTOCOL DIRECTED INFRARED COMMUNICATION CONTROLLER

CROSS-REFERENCE

The present application and invention are related in subject matter to co-pending U.S. patent application Ser. No. 08/323,324, 08/323,331, and 08/323,332 filed concurrently herewith by the same inventors and assigned to the same assignee as this application.

BACKGROUND OF THE INVENTION

1. Field of the Invention

The present invention relates to modulating digital communications, and more particularly to infrared (IR) communications and a controller for handling a multiplicity of modulation protocols used with IR signal systems.

2. Problem to be Solved

The most ubiquitous application of infrared (IR) signal systems to date has been the remote controller for home appliances, but IR signals are now being adapted for many other applications such as computer communications. An Infrared Data Access Standard committee (IRDA) has been formed to enhance interoperability among various vendor's products. The IRDA recommended standard utilizes a Universal Asynchronous Receiver/Transmitter (UART) in order to achieve low cost infrared communication with SDLC type of communication protocols. Since this standard is implemented with a UART, there are various problems associated with it by virtue of the asynchronous design. Two such problems are the bus throughput bottleneck and the overhead associated with asynchronous communication schemes. UARTs have been typically integrated into existing systems using interrupts to initiate the transfer of data to and from the system. The system latency in responding to these interrupt requests generates a bottleneck which limits the data throughput. Also, although the standard UART can run at baud rates up to 115.2 Kbps, the effective throughput is actually much less due to the overhead associated with asynchronous transfers. Consequently, the maximum data rate is not adequate for applications which transfer large amounts of data. Further, because the standard implementation only supports Hewlett-Packards' style of modulation, it is restricted in its application to only devices which follow that standard.

The use of a single UART poses another problem for IR systems since application programs usually access the UART directly leaving no space to intercept the data. For many existing IR communication programs, some intervention is necessary to adjust for the fact that the UART is being used for infrared rather than in a typical hardwired environment.

A further problem in this art is that existing multiprotocol communication controllers can run at only one type of modulation scheme at a time. Consequently, while waiting for an incoming signal, the controller is set to accept only one type of signal. This results in a loss of initial frames when a different type of signal is received until the incoming modulation scheme is detected and the controller is switched to the appropriate demodulator. While this is not serious as long as the communication protocol is set to deal with such problems, in the case of applications that do not take into account the fact that a UART is being used for IR communication, a missing first byte could be a critical problem.

The present invention is directed to solving the problems described above and provides an automatic modulation detection and handling scheme which can be implemented in an IR controller having an architecture designed to achieve solutions for these problems.

OBJECTS

It is therefore an object of the present invention to provide a communications controller which supports interoperability between various communication protocols.

It is another object of the present invention to provide an IR controller and technique for automatically determining which type of signal is being received and for producing an appropriate IR signal.

It is a further object of the present invention to provide an IR communication system that can communicate at high baud rates and also support the IRDA standard.

SUMMARY OF THE INVENTION

The present invention embodies a new architecture for a communications controller and preferably a wireless communication controller for use with infrared (IR) signals that resolves the prior art problems of dealing with high baud rates and supporting the IRDA standard. The controller system essentially combines a synchronous/asynchronous communication controller, one or two UARTs, and dedicated support logic, along with a number of digital modems which may consist of an IR MODEM array connected in parallel. This combination provides a platform which is backward compatible with many of the existing IR communication systems and protocols while being advanced with regard to IR specific support and higher data rates.

DETAILED DESCRIPTION OF THE INVENTION

Figure 1:
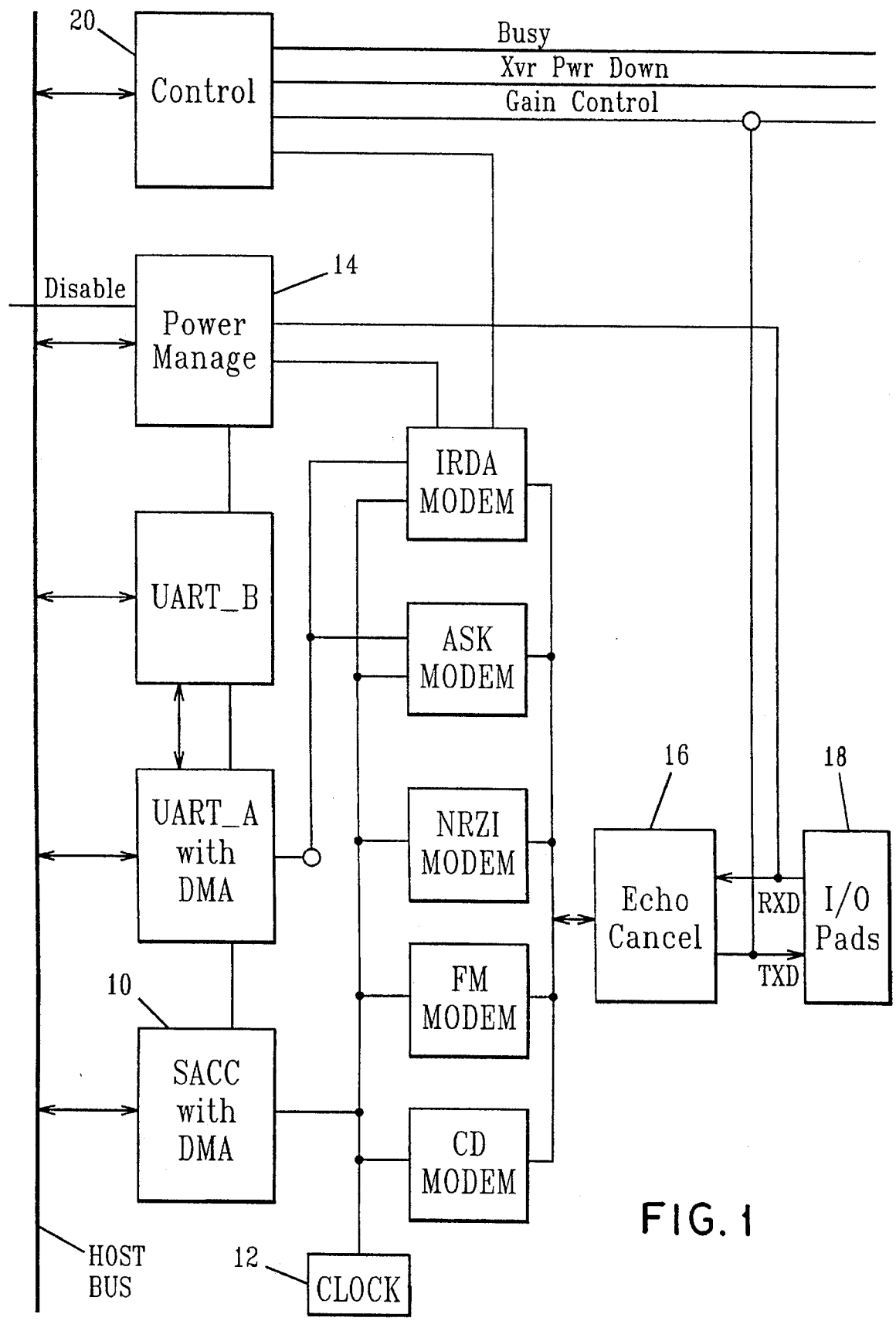
FIG. 1 is a block diagram of a controller architecture for incorporation into an IR transceiver in accordance with the present invention.

A block diagram of a controller architecture in accordance with the present invention, which can be incorporated in an IR transceiver, is shown in FIG. 1. The controller system essentially combines a communication controller 10, a primary UART, UART_A, a secondary UART, UART_B, dedicated support logic, and a number of digital modems which may consist of an IR MODEM array connected in parallel. The controller system and its operation will be described in terms of its various functions.

BACKWARDS COMPATIBILITY

A standard UART, UART_A, is incorporated into the controller system architecture to provide full compatibility with the IRDA standard specification. For the case where the Host containing the controller system runs an application program which is written so that it follows a proper infrared communication protocol, UART_A can be connected directly between the HOST BUS and any asynchronous modems, such as, an IRDA MODEM and an Amplitude Shift Keying (ASK) MODEM, in an IR MODEM array. If, however, the application program is written without any provision for a proper communication protocol, a second UART, UART_B, may be added and connected to the first UART, UART_A. In such a case, when this feature is enabled, transmitted signals outgoing through UART_A can be captured by second UART_B and fed back through the HOST BUS to the HOST's central processor before the signal is actually sent out. These intercepted signals may then be run through an appropriate communication protocol which will check the integrity of the data before passing the outgoing signal to the controller 10, the IR MODEMs and the infrared output 18. The incoming or received data will pass through the IR MODEMS and the controller 10 and may be filtered by the HOST processor and transferred through second UART_B before it reaches first UART_A. Thus, UART_A may either be connected to the IR MODEM array directly or to UART_B. The system can therefore fully support existing IR aware applications and provide some degree of IR transparency to communications written for a wired UART.

SYSTEM THROUGHPUT

In order to increase the effective data rate, a synchronous communication block is incorporated into the controller 10. This block will be called a Synchronous/Asynchronous Communication Controller, or SACC, herein, and like UART_A is provided with Direct Memory Access (DMA) as will be more fully explained. This SACC, which may be a modified version of a Z85C30 FSB obtainable from VLSI Technology, Inc., Burlington, Mass., as will be more fully explained below, is designed to operate either in synchronous mode or in asynchronous mode, and is therefore the only component that is connected to both synchronous and asynchronous IR MODEMs in the IR MODEM array.

The SACC primarily functions to send or receive the data in synchronous mode for high speed data transfer. The use of synchronous data transfer improves system throughput by eliminating the overhead of start and stop bits which are required in asynchronous communication. Support logic is provided in the SACC to switch the system clock source 12 to the SACC to enable synchronous data rates of 2.34 Mbps, 1.152 Mbps, 576 Kbps, 288 Kbps, and 144 Kbps. Further, the SACC may improve system performance by being adapted to assume many of the tasks which would normally require the system processor. For example, the SACC may include the ability to perform address recognition, CRC calculation, and frame status maintenance in hardware.

As noted above, one of the biggest problems in high speed data transfer is the bus throughput bottleneck. Although there are several ways to resolve this problem, including a local frame buffer, in the present architecture Direct Memory Access (DMA) with 16 by 8 bit FIFOs is used for the receive and transmit of both UART_A and SACC HOST interfaces. UART_B is also equipped with FIFO but does not use DMA. Since the number of DMA channels on the HOST BUS is usually limited, two channels may be shared by both the UART_A and SACC. Each DMA channel can be programmed to use either of these two channels or it can be disabled as well. Two interrupt signals are generated to gain attention from the Host. One of these two interrupts is generated solely by UART_A and the other one is shared by SACC, UART_B, and the Power Management logic 14 (see FIG. 1).

MULTIPLE MODULATION SCHEMES

The present system is intended to support multiple modulation schemes and, as a result, an array of digital modems is included, which preferably are IR MODEMs and consist of an array of five units or components. The array preferably incorporates an IRDA compatible MODEM (IRDA MODEM), a Sharp 500 KHz Amplitude Shift Keying (ASK) compatible MODEM (ASK MODEM), an NRZI with a fractional Bit Cell pulse width Flash MODEM (NRZI MODEM), a Biphase or FM with a fractional Bit Cell pulse width Flash MODEM (FM MODEM), and a Consumer Device MODEM (CD MODEM). Exemplary preferred embodiments of the ASK MODEM, NRZI MODEM, and FM MODEM for use in this system are disclosed in co-pending U.S. patent applications Ser. Nos.(Y0994-178), (Y0994-176), and (Y0994-179), filed by the same inventors on even date herewith, and incorporated herein by reference. Since the NRZI MODEM, FM MODEM and CD MODEM are not utilized by UART_A, UART_A is only connected to the IRDA MODEM and ASK MODEM, while the SACC can be connected to all five MODEMs. UART_B is not connected to any MODEM.

Figure 2:
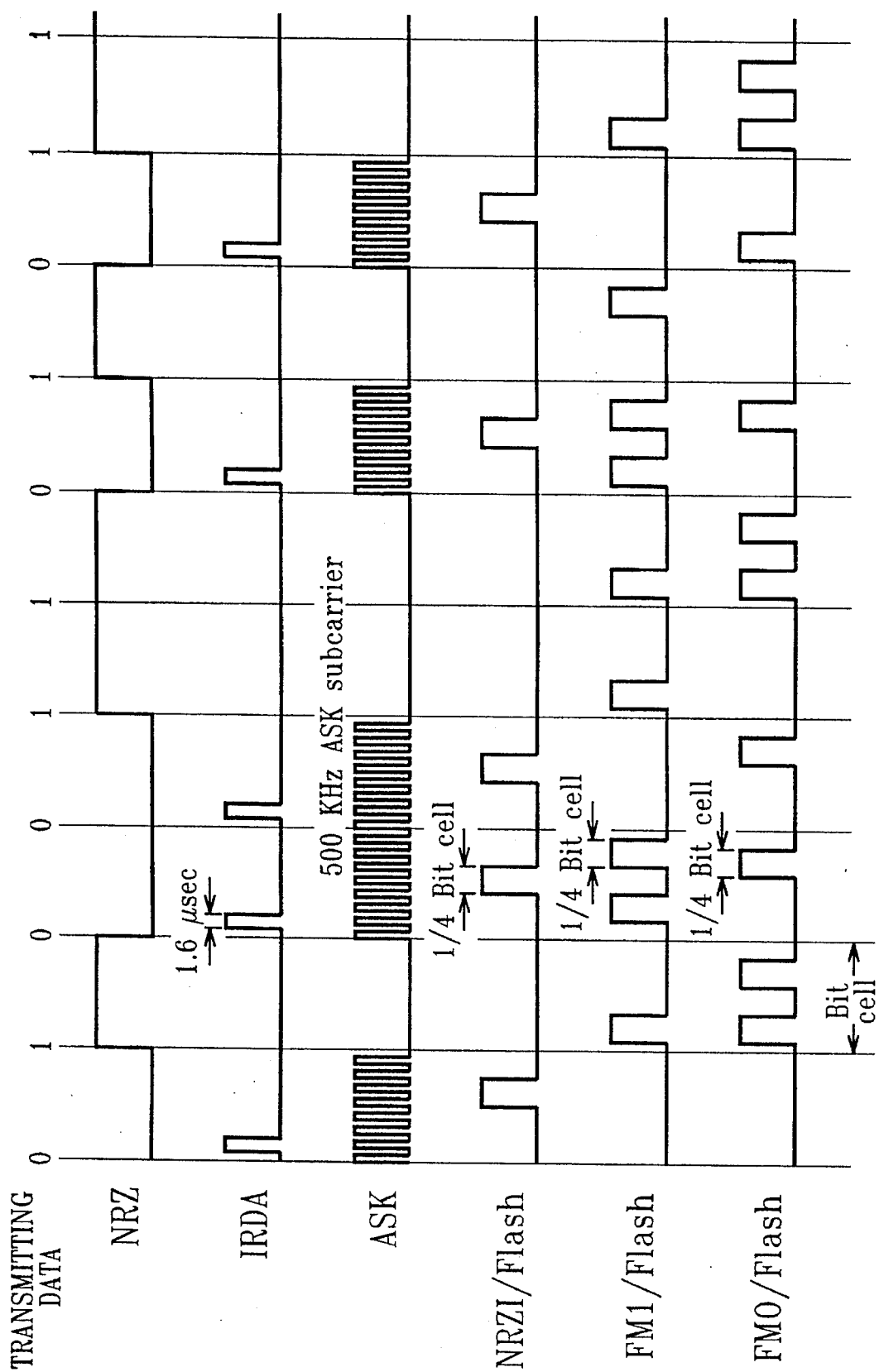
FIG. 2 is a diagram illustrating the relationship of the signals of various modulation protocols used with the present invention.

The modulation scheme of the IRDA MODEM is the same as the IRDA standard. By way of a brief description here to provide a basic understanding, signals are conceptually divided into bit cells and on the transmitter side, a pulse of $3/16$ bit cell width or a fixed width approximately 1.63 microseconds long, is developed whenever the transmitting data is zero (see the comparison of signal forms in FIG. 2). On the receive side, the received pulse is prolonged for a full bit cell width and a LOW signal is generated for that bit cell period to produce an NRZ (Non-Return-to-Zero) signal output. The incoming transmitted signal is also in NRZ format.

The modulation scheme of the ASK MODEM follows Sharp's 500 KHz subcarrier ASK modulation. On the transmit side, 500 KHz subcarrier square wave pulses are transmitted whenever the transmitting data is zero (see FIG. 2). On the receive side, a digital bandpass filter is implemented to demodulate the ASK modulated signal to NRZ format. As a part of the bandpass filter logic, 500 KHz carrier detect logic is used to distinguish the ASK modulated signal from other signals.

The modulation scheme of the NRZI MODEM briefly operates as follows. For the transmitted signal, the incoming digital data is first encoded in NRZI (Non-Return-to-Zero-Inverted) format, which undergoes a transition whenever the transmitting data is zero. Additionally, zero bits are inserted in the incoming data, before encoding, whenever five consecutive 1 bits are detected. Then, a fractional, preferably about ¼, bit-cell width IR Flash pulse is transmitted whenever a transition is detected in the encoded signal (see FIG. 2). On the receive side, whenever a transition in the incoming IR signal is detected, the output signal is toggled to create an NRZI format signal. The NRZI formatted signal is fed to the SACC and the SACC decodes it into NRZ format data.

The modulation scheme of the Biphase or FM MODEM briefly is as follows. For the transmitted signal, the incoming data is first encoded as Biphase Mark (FM1) or Biphase Space (FM0) format, which data formats follow different transitions in the data. Then the encoded bit cell in each format is divided into a ½ bit cell for consideration. In both formats, whenever there is a HIGH level signal in the half bit cell, a fractional, preferably about ¼, bit-cell width IR Flash pulse is transmitted (see FM1/Flash and FM0/Flash in FIG. 2). On the receive side, whenever a pulse is detected, the pulse is extended to the full half bit cell width. In some cases, such as when receiver saturation occurs, the received pulse may be lengthened by the receiver circuit. Therefore, in order to avoid confusion between a single pulse and two combined consecutive pulses, the second sampling time is determined from the leading edge of the first incoming pulse. This FM formatted received signal is decoded by the SACC to NRZ format.

The CD MODEM is achieved by simply bypassing all of the preceding MODEMs and using the baudrate generator of the SACC to generate a carrier frequency for the transmitted pulse. The MODEM software uses a system timer to determine pulse duration. On the receive side, there are several ways to implement the CD demodulator. For example, the unmodulated signal may be fed to the Data Carrier Detect (–DCD) pin of the SACC so that software can be used to measure the carrier frequency and then measure the pulse duration. Various other ways to support the Consumer Device Infrared signals will be within the purview of those of skill in the art.

MULTIPLE MODULATION DETECTION SUPPORT

Since the IR controller of the invention can support multiple modulation schemes, provisions are included to find out which MODEM of the IR MODEM array to use for a particular communication. The IR modulation detection strategy builds upon the fact that the IR controller can be configured to run a synchronous MODEM at the same time as the asynchronous MODEMs are running. That is, the IRDA MODEM, ASK MODEM, and CD MODEM, as well as either one of the NRZI or FM MODEMs, may all be enabled at the same time while the controller is ready to receive an incoming signal. Although existing IR communication programs usually have some sort of communication protocol to recover lost data, earlier applications which used an IRDA type modulated signal did not run any such protocol. The IRDA modulation detection therefore must occur without the loss of any data. Because the IRDA type of signal may not recover from the loss of the first character of data, UART_A should be connected to the IRDA MODEM and be ready to receiver IRDA data. In contrast, the ASK type of signal has always had some sort of communication protocol since the introduction of such a scheme, so loss of the first character is acceptable. Since the ASK modulation scheme will recover from the loss of a character, only the auto carrier detection logic of the ASK MODEM needs to be enabled while waiting for an incoming signal. The IR controller may then switch on the ASK modem only after the first bit of the ASK carrier is detected. Since high speed synchronous communication always runs a communication protocol, it is predictable as to whether NRZI or FM modulation will be used so either modem may be selected while waiting. Finally, the CD MODEM is always connected to the –DCD line of the SACC.

When an unknown signal reaches the receive line RXD of the present controller, the incoming signal will go through the IRDA MODEM, the selected synchronous MODEM (NRZI or FM), and the CD MODEM in parallel with the ASK carrier detection logic. If the incoming signal is IRDA type, then: 1) UART_A should receive the correct data without any frame error; 2) the ASK carrier detect logic should not detect any ASK carrier; and 3) the SACC should either not receive a valid opening frame character or receive an aborted frame. The –DCD line of the SACC should detect some transition of level, and from that, the program should be able to measure the pulse width and carrier frequency if the pulse is wide enough to be a consumer device signal. From all of these occurrences, the program can conclude the incoming signal is IRDA type.

If the incoming signal is a 500 KHz ASK modulated signal, then: 1) the IRDA MODEM will not demodulate the signal properly causing a possible frame error on the UART_A; 2) the ASK carrier detect logic should detect the carrier; and 3) the SACC may possibly receive an aborted signal. The –DCD input of the SACC should detect transition and, from that, the program should be able to measure the pulse width and carrier frequency if the pulse is wide enough to be a consumer device signal. From this observation, the program can conclude that the received signal is an ASK signal and prepare the controller to receive an ASK signal instead of an IRDA signal.

If the incoming signal is a high speed synchronous signal (see FIG. 4), the SACC should detect proper flags and an unaborted data frame along with the correct CRC. If this is the case, it can clearly assume that the received signal is a high speed synchronous signal (either NRZI or FM).

If the incoming signal is none of the above, then by measuring the duration of transition of the incoming signal on the –DCD line of SACC, it can be determined whether it is a consumer bus signal since a consumer signal is relatively slow but has a fixed carrier frequency unlike an IRDA signal.

ECHO CANCELLATION

The system includes several features specifically to compensate for some of the problems encountered in using infrared as a transmission medium. For example, when the IR light signal is transmitted by the IR transceiver, the infrared signal or electrically coupled signal can be picked up by the receiver coupled in the transceiver unit. This type of echo is sometimes useful for collision detection or transmission verification, but, most of the time, this echo is more troublesome than beneficial for the communication protocols. Therefore, the controller architecture also provides an option to cancel the echo of its own transmitted signal. The outputs of all the IR MODEMs are combined and sent to an Echo Cancellation logic circuit 16 (see FIG. 1). Circuit 16 has a pulse output on transmit data line TXD and an input on receive data line RXD, which lines go to I/O pads 18 that interface with the IR transceiver which produces and receives IR light pulses. If echo cancellation is enabled, the receive data line RXD is gated off about 25 ns after the leading edge of the transmitted pulse and remains off for 750 ns after the trailing edge of the transmitted pulse on transmit data line TXD. If echo cancellation is disabled, the transceiver can receive any incoming signal from another receiver or transmitter. The output of the echo cancellation logic on TXD is brought out to the I/O pad 18, as well as fed back to the receive line RXD if loop-back is enabled, so that it can receive its own transmitted signal. This loop-back feature is useful for system diagnosis.

POWER CONSIDERATIONS

One of the significant advantages of infrared wireless communication over other types of wireless communication is that it can operate at very low power and therefore it is suitable for low power applications such as portable computer communication. However, as the data rates and operating distances increase, power dissipation in such infrared communication is becoming quite significant. As a result, very thorough Power Management logic 14 is incorporated in the present architecture for selectively activating and deactivating the various components. In particular, UART_A, UART_B and the SACC can be individually shutoff under software control. Of course, UART_A has to be on to use UART_B since UART_B without UART_A is not a useful configuration. Only the currently selected MODEM of the IR MODEM array need be enabled and the rest of the MODEMs may be disabled. In addition to these individual controls, there may also be a global disable signal that will put the whole IR communication controller into low power state while retaining all of the register contents. The controller may provide a programmable flag that indicates the activity of the IR communication that can be used along with the global disable signal in order to prevent an unwanted disable in the middle of communication. While the controller is in low power state, any incoming infrared signal can generate an interrupt if enabled so that the Host can return the controller to the active state. The controller can be connected to two infrared transceivers with separate power down signals in case the system needs two infrared windows to cover more than one direction.

The architecture also provides circuitry 20 for producing a signal that can be used for controlling the gain of the IR transceiver. This gain control signal can be used with transceiver power down signals, and transmit data (TXD) and receive data (RXD) signals in order to control the transmitting power as well as the receiver amplifier gain. The gain control signal is multiplexed with the transmitting data TXD signal (see FIG. 1) so that the design of the IR transmitter can be simplified in case the receiver gain control is not used. Since the controller covers a variety of data rates and modulation schemes, it is very difficult to optimize the IR transceiver for one particular speed and modulation. In case the dual channel receiver is designed for high speed and low speed, the controller also provides high speed input as well as low speed input. The low speed input is connected to the asynchronous IRDA MODEM and the high speed input is connected to the NRZI, ASK, and FM MODEMS. The CD MODEM input is connected to both the high speed and low speed inputs.

HARDWARE

Industry standard components may be used to reduce design time and cost in assembling and constructing the controller of the invention. For example, in the above-described architecture UART_A and UART_B may be implemented using a 16550 FSB (Function System Block) available from VLSI Technology, Inc., Burlington, Mass. For the SACC, a modified version of a Z85C30 FSB also available from VLSI Technology, Inc., that was originally designed by Zilog Inc., may be used. These three FSBs may be integrated into a 0.8 micron CMOS Standard Cell design along with control power management logic (14), echo cancellation logic (16), gain control logic (20), and host interface logic as well as the IR MODEMs.

Figure 3:
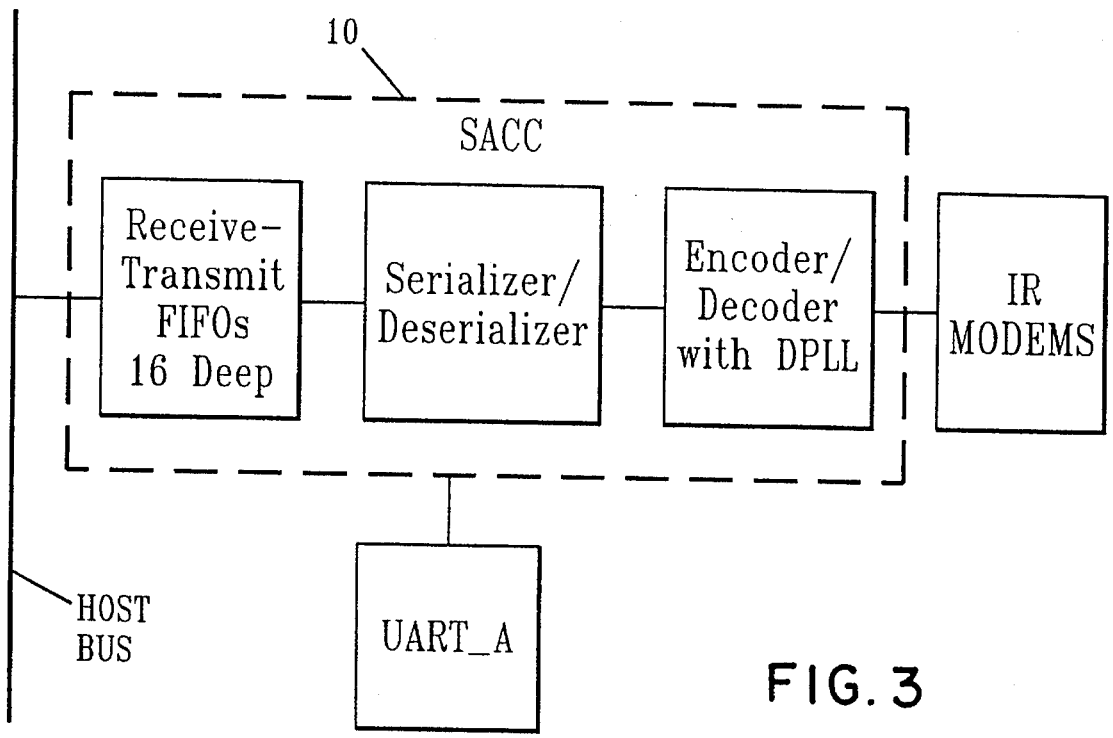
FIG. 3 is a block diagram of some of the components in a Synchronous/Asynchronous Communication Controller, or SACC, which may be used in the architecture of the present invention.
Figure 4:
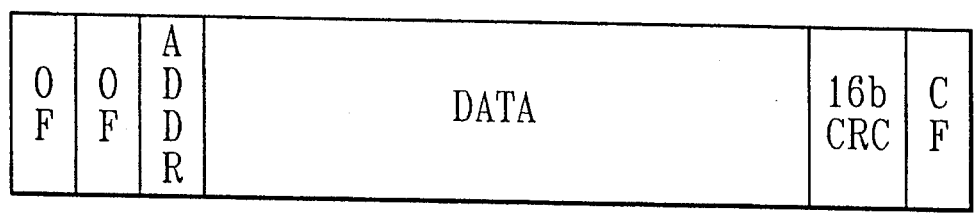
FIG. 4 is a diagram illustrating the relationship of the various elements in a synchronous signal.

The Z85C30 FSB may be modified in such a way that it follows the architecture described above. Since the SACC is typically used at higher baud rate, the bus throughput is most critical. Therefore, the depth of the FIFOs for both receive and transmit are increased to 16, as seen in FIG. 3, and DMA support is added. Further, in order to reduce Host intervention while running data, some automatic features such as automatic two opening flag insertions are added (see FIG. 4). The SDLC format frame has been adopted for the IRDA and therefore, as an extension to IRDA, the high speed synchronous communication also uses an SDLC frame. This frame has a minimum width of two opening flags (OF), an optional 8 bit address field (ADDR) followed by the data field (DATA), a 16 bit CCITT CRC, and then finally a minimum of one closing flag (CF) as shown in FIG. 4. Accordingly, the Z85C30 FSB hardware may be configured to automatically insert a minimum of two opening flags, and may be modified to assert a 16 bit CCITT CRC at the end of a frame automatically if synchronous communication is enabled, as well as to append a minimum of one closing flag at the end of the CRC. Zero-bit stuffing is also used to distinguish flags from data as well as to ensure that some AC (Alternating Current) components exist in the frame so that the digital phase lock loop can be locked on the incoming signal in case the NRZI MODEM is used.

The Z85C30 FSB implementation is modified to allow its baud rate generator (BRG) counter to be used as a transmit byte counter. The PCLK source selection for the BRG is changed to accept the WRITE signal to either WRITE register seven (WR7) or the transmit FIFO as the clock input rather than the PLCK input when bit one of WRITE register fourteen (WR14) is set. When this mode is selected the BRG counter is decremented in response to each WRITE signal to either WR7 or the transmit FIFO. The zero count output of the BRG is used to activate the asynchronous clear of the send abort bit (bit 3) in WRITE register 10 WR10 when in this mode. In the current implementation, the BRG may therefore be loaded with the number of bytes intended to be transmitted and the send abort bit may be set by software. When the correct number of bytes have been written to the transmit FIFO, the BRG zero count output will be set and the send abort bit will be reset so the frame will be closed with a flag. If the system closes the frame before the correct number of bytes have been sent, the send abort bit will remain set and the frame will close with an abort sequence.

In order to simplify the external miscellaneous logic, the implementation utilizes the built-in digital phase lock loop (DPLL) of the SACC and the deserializers of the SACC and UARTs as much as possible. Therefore, the IR MODEM array is not designed to lock on to the carrier frequency but simply to modulate or demodulate signals with some minimal digital filters. Suitable implementations of the IR MODEMs are disclosed in the above-cited co-pending applications. As the wave forms indicate in FIG. 2, the encoder and the modulator convert the NRZ wave form to a corresponding modulated signal. The decoder and demodulator convert the modulated signals back to NRZ format. Either UART_A or the SACC is then responsible for appending or deleting the start/stop bits or flags.

In order to comply with the IRDA standard as well as to provide 100 percent compatibility with asynchronous serial COM port application, a 16550 UART is selected for UART_A. The address of UART_A is completely programmable so that it can be mapped to any standard COM port addresses. The addresses for the SACC and UART_B as well as the Control (20) and Power Management (14) logics (see FIG. 1) are reserved in 16 continuous byte locations. A separate 8 byte address range is reserved for configuration of the chip.

As noted above, the IR communication controller of the invention can be implemented with or without UART_B depending upon the application the system is intended to support. If the programs that will run with the controller are written for IR communication with the standard UART, then UART_B may be omitted. If, however, the controller must support application programs which were written without awareness of the fact that the COM port is used as an infrared communication port, then UART_B must be added. When UART_B is added and the wrapping of signals of UART_A and UART_B is enabled, the serial in data of UART_A is connected to the serial out of UART_B, and the serial out data of UART_A is connected to the serial in of UART_B. The MODEM signals are connected as a null MODEM cable. For example, the –RTS pin of UART_A is connected to the –CTS pin of UART_B and vice versa. The –DTR of UART_A is connected to the –DST of UART_B and vice versa. The –DCD pin of UART_A is connected to the OUT1 of UART_B and –RI of UART_A is connected to –OUT2 of UART_B. When the wrapping is not enabled the UART_A serial in or serial out data lines can be connected to either the IRDA MODEM or ASK MODEM. The MODEM control signals such as –RTS or –DTR remain connected between UART_A and UART_B whether the wrapping is enabled or not. The Baudout clock of UART_A is connected to the clock input of UART_B so that UART_A and UART_B call always run at the same speed. It is important, however, to make sure that the Baud Divisor Latch of UART_B always has a value of 1. The line control register (LCR) of UART_B, except for the bit 7 which is the Baud Divisor Latch Access bit, is designed to have the same values as UART_A whenever the LCR of UART_A is updated so that communication between UART_A and UART_B can be performed with the same configuration. Although the suggested UART_B implementing industry standard 16550 UART is typically used without DMA support, the 16550 has built-in DMA support logic. Since the system bus throughput is one of the bottlenecks, DMA support logic for UART_A has been implemented in this embodiment. Because of the requirement of high bus throughput during the wrapping of UART_A and UART_B, it is expected that the wrapping will run only at slow baud rate and therefore, DMA is not supported on the UART_B in this particular implementation.

The transmit data line (TXD) is connected to the outputs of the IRDA MODEM, ASK MODEM, NRZI MODEM, FM MODEM and CD MODEM and the receive data line (RXD) is connected to the inputs of the IRDA MODEM, ASK MODEM, NRZI MODEM, and FM MODEM. The output of the CDMODEM is connected to the –DCD line of the SACC. The transmit data line of the SACC is activated only during the time the –RTS of SACC is active so that the transmitter can be quiet during the idle or receive state. The Control logic can enable one or more MODEMs at a time depending on the protocols it is running. The IRDA MODEM and FM MODEM use oversampling clocks for both transmit and receive. The NRZI MODEM also uses the oversampling clock although it is not absolutely necessary. The ASK MODEM uses a system clock to generate a fixed frequency carrier and the receiver also uses the system clock to synthesize a digital bandpass filter. The CD MODEM uses a built-in baudrate generator.

It will be seen that the IR controller of the invention can be used in any computing system as well as in any appliance controller along with some intelligent processing units such as an embedded infrared communication controller. This IR controller can also be used in an adapter card for a desktop computer as well as in peripherals such as printers in order to provide local directed wireless communication.

While the invention has been particularly shown and described with respect to a preferred embodiment thereof, it will be understood by those skilled in the art that changes in form and details may be made therein without departing from the scope and spirit of the invention.

What is claimed is:

1. A controller system for use in a communication transceiver having a bus for internally transferring signals, comprising:

a plurality of modem means for selectively modulating and demodulating synchronous and asynchronous signals with respective coding formats, at least one of said modem means encoding asynchronous signals and at least one of said modem means encoding synchronous signals;

a UART connected between said bus and at least one of said asynchronous signal encoding modem means for transferring asynchronous signals therebetween;

a synchronous/asynchronous communication controller (SACC) means, connected between said bus and said plurality of modem means, for transferring asynchronous signals between said bus and said asynchronous signal encoding modem means and transferring synchronous signals between said bus and said synchronous signal encoding modem means, whereby said controller system modulates and demodulates signals with both synchronous and asynchronous coding formats; and further comprising:

checking means for checking a signal for integrity; and a second UART, connected between said UART and said bus, for intercepting and transmitting an input signal to said checking means for an integrity check.

2. The system of claim 1 wherein said plurality of modem means comprises an IRDA MODEM and an NRZI MODEM.

3. The system of claim 1 wherein said plurality of modem means comprises an IRDA MODEM and a Biphase MODEM.

4. The system of claim 1 wherein said plurality of modem means comprises an ASK MODEM.

5. The system of claim 1 further comprising Direct Memory Access means coupled to said UART and said SACC means.

6. The system of claim 1 further comprising means for selectively managing the power supplied to said UART, SACC, and said plurality of MODEM means.

7. The system of claim 1 further comprising:

receiving means, connected to said plurality of modem means, for receiving and feeding modulated signals thereto; and transmitting means, connected to said plurality of modem means, for transmitting modulated signals therefrom.

8. The system of claim 7 further comprising gain control means, connected to said receiving means and said transmitting means, for controlling the gain of said modulated signals.

9. The system of claim 7 further comprising echo cancelling means, connected to said receiving means and said transmitting means, for gating off said receiving means for a predetermined period after the output of a transmitted signal on said transmitting means.

10. The system of claim 7 further comprising IR output means, connected to said transmitting means, for converting transmitted signals from said transmitting means to IR light signals.

11. The system of claim 1 further comprising clock means, connected to said SACC, for producing synchronous data rates of 2.34 Mbps, 1.152 Mbps, 576 Kbps, 288 Kbps, and 144 Kbps.

12. The system of claim 1 wherein said SACC means further comprises:

means for performing address recognition;
means for CRC calculation; and
means for frame status maintenance.

13. A controller system for use in a communication transceiver having a bus for internally transferring signals, comprising:
a plurality of modem means for selectively modulating and demodulating synchronous and asynchronous signals with respective coding formats, at least one of said modem means encoding asynchronous signals and at least one of said modem means encoding synchronous signals;
a UART connected between said bus and at least one of said asynchronous signal encoding modem means for transferring asynchronous signals therebetween;
a synchronous/asynchronous communication controller (SACC) means, connected between said bus and said plurality of modem means, for transferring asynchronous signals between said bus and said asynchronous signal encoding modem means and transferring synchronous signals between said bus and said synchronous signal encoding modem means, whereby said controller system modulates and demodulates signals with both synchronous and asynchronous coding formats; and
wherein said plurality of modem means comprises:
an IRDA MODEM, an NRZI MODEM, a Biphase MODEM, an ASK MODEM, and a CD MODEM; and
further comprising means for enabling said IRDA MODEM, ASK MODEM, and CD MODEM, and either one of said NRZI or Biphase MODEMs, at the same time, when said MODEMS are ready to receive an incoming signal.

14. The system of claim 13 further comprising:
means, in said SACC, for detecting a transition in an incoming signal; and
means, coupled to said SACC, for measuring the pulse width and carrier frequency of said incoming signal.

15. A method for modulating and demodulating signals with both synchronous and asynchronous coding formats in a communication transceiver having a bus for internally transferring signals to be modulated, comprising the steps of:
connecting a plurality of modems in parallel for selectively modulating and demodulating synchronous and asynchronous signals with respective coding formats, at least one of said modems encoding asynchronous signals and at least one of said modems encoding synchronous signals;
connecting a first UART between said bus and at least one of said asynchronous signal encoding modems for transferring asynchronous signals therebetween;
connecting a synchronous/asynchronous communication controller (SACC) between said bus and said plurality of modems, for transferring asynchronous signals between said bus and said asynchronous signal encoding modems and transferring synchronous signals between said bus and said synchronous signal encoding modems; and
connecting a second UART between said first UART and said bus, for intercepting and transmitting an input signal from said first UART to said bus for an integrity check.

16. The method of claim 15 wherein said plurality of modems comprises an IRDA MODEM and an NRZI MODEM.

17. The method of claim 15 wherein said plurality of modems comprises an IRDA MODEM and a Biphase MODEM.

18. The method of claim 15 wherein said plurality of modems comprises an ASK MODEM.

19. The method of claim 15 further comprising the step of connecting a clock to said SACC, for producing synchronous data rates of 2.34 Mbps, 1.152 Mbps, 576 Kbps, 288 Kps, and 144 Kbps.

20. The method of claim 15 further comprising the steps of using said SACC for performing address recognition, CRC calculation, and frame status maintenance.

21. A method for modulating and demodulating signals with both synchronous and asynchronous coding formats in a communication transceiver having a bus for internally transferring signals to be modulated, comprising the steps of:
connecting a plurality of modems in parallel for selectively modulating and demodulating synchronous and asynchronous signals with respective coding formats, at least one of said modems encoding asynchronous signals and at least one of said modems encoding synchronous signals;
connecting a UART between said bus and at least one of said asynchronous signal encoding modems for transferring asynchronous signals therebetween;
connecting a synchronous/asynchronous communication controller (SACC) between said bus and said plurality of modems, for transferring asynchronous signals between said bus and said asynchronous signal encoding modems and transferring synchronous signals between said bus and said synchronous signal encoding modems; and
wherein said plurality of modems comprises an IRDA MODEM, an NRZI MODEM, a Biphase MODEM, an ASK MODEM, and a CD MODEM, and further comprising the step of enabling said IRDA MODEM, ASK MODEM, and CD MODEM, and either one of said NRZI or Biphase MODEMs, at the same time when said MODEMS are ready to receive an incoming signal.

22. The method of claim 21 further comprising:
means, in said SACC, for detecting a transition in an incoming signal; and
means, coupled to said SACC, for measuring the pulse width and carrier frequency of said incoming signal.

23. The system of claim 13 further comprising Direct Memory Access means coupled to said UART and said SACC means.

24. The system of claim 13 further comprising means for selectively managing the power supplied to said UART, SACC, and said plurality of MODEM means.

25. The system of claim 13 further comprising:
receiving means, connected to said plurality of modem means, for receiving and feeding modulated signals thereto; and
transmitting means, connected to said plurality of modem means, for transmitting modulated signals therefrom.

26. The system of claim 25 further comprising gain control means, connected to said receiving means and said transmitting means, for controlling the gain of said modulated signals.

27. The system of claim 25 further comprising echo cancelling means, connected to said receiving means and said transmitting means, for gating off said receiving means for a predetermined period after the output of a transmitted signal on said transmitting means.

28. The system of claim 25 further comprising IR output means, connected to said transmitting means, for converting transmitted signals from said transmitting means to IR light signals.

29. The method of claim 21 further comprising the step of connecting a clock to said SACC, for producing synchronous data rates of 2.34 Mbps, 1.152 Mbps, 576 Kbps, 288 Kbps, and 144 Kbps.

30. The method of claim 21 further comprising the steps of using said SACC for performing address recognition, CRC calculation, and frame status maintenance.

* * * * *